US 7,840,890 B2

(12) United States Patent
Lund (10) Patent No.: US 7,840,890 B2
(45) Date of Patent: Nov. 23, 2010

(54) GENERATION OF RANDOMLY STRUCTURED FORMS

(75) Inventor: Christopher D. Lund, Escondido, CA (US)

(73) Assignee: EMC Corporation, Hopkinton, MA (US)

( * ) Notice: Subject to any disclaimer, the term of this patent is extended or adjusted under 35 U.S.C. 154(b) by 939 days.

(21) Appl. No.: 11/711,451

(22) Filed: Feb. 26, 2007

(65) Prior Publication Data

US 2008/0205742 A1  Aug. 28, 2008

(51) Int. Cl.
*G06F 17/20* (2006.01)

(52) U.S. Cl. .......................... 715/222; 715/226

(58) Field of Classification Search .......... 715/221–226
See application file for complete search history.

(56) References Cited

U.S. PATENT DOCUMENTS

| | | | | |
|---|---|---|---|---|
| 5,652,835 | A * | 7/1997 | Miller | 714/38 |
| 5,926,825 | A * | 7/1999 | Shirakawa | 715/273 |
| 5,956,738 | A * | 9/1999 | Shirakawa | 715/273 |
| 6,366,918 | B1 * | 4/2002 | Guttman et al. | 707/100 |
| 6,442,714 | B1 * | 8/2002 | Griffin et al. | 714/46 |
| 2002/0059339 | A1 * | 5/2002 | McCormick et al. | 707/500.1 |
| 2002/0140982 | A1 * | 10/2002 | Nitta et al. | 358/1.18 |
| 2003/0188260 | A1 * | 10/2003 | Jensen et al. | 715/505 |
| 2003/0233296 | A1 * | 12/2003 | Wagner | 705/31 |
| 2004/0117731 | A1 * | 6/2004 | Blyashov | 715/507 |
| 2004/0194035 | A1 * | 9/2004 | Chakraborty | 715/531 |
| 2004/0223645 | A1 * | 11/2004 | Cliff | 382/186 |
| 2005/0049815 | A1 * | 3/2005 | Watanabe et al. | 702/123 |
| 2005/0132278 | A1 * | 6/2005 | Yoshida | 715/513 |
| 2005/0216493 | A1 * | 9/2005 | Fujita | 707/100 |
| 2005/0223319 | A1 * | 10/2005 | Ohashi et al. | 715/517 |
| 2006/0023932 | A1 * | 2/2006 | DeMaris et al. | 382/145 |
| 2006/0036612 | A1 * | 2/2006 | Harrop et al. | 707/100 |
| 2006/0101397 | A1 * | 5/2006 | Mercer et al. | 717/120 |
| 2007/0089049 | A1 * | 4/2007 | Gormish et al. | 715/507 |
| 2007/0106977 | A1 * | 5/2007 | Arguelles | 717/115 |

FOREIGN PATENT DOCUMENTS

WO   WO 2004006111 A2 *  1/2004

OTHER PUBLICATIONS

Zi, Groundtruth Generation and Document Image Degredation, May 2005, Masters Thesis—University of Maryland—Institute for Advanced Computer Studies, Abstract and pp. 1-59.*

(Continued)

*Primary Examiner*—Doug Hutton
*Assistant Examiner*—Frank D Mills
(74) *Attorney, Agent, or Firm*—Barry N. Young (57) ABSTRACT

A computer system and method for generating a plurality of unique, randomly structured forms, such as invoices, that may be populated with data to produce test forms for testing automatic document processing systems. The forms may have major blocks such as a header, a body and a footer, and the major blocks may have randomly selected sizes. For each block, the locations of data fields and the ordering of the data fields within the block are defined randomly, the data locations within the fields and the data formats are randomly defined, and a blank image and an XML file of the randomly structured form are produced. The forms generated may be populated with data for the testing document processing system.

18 Claims, 10 Drawing Sheets

OTHER PUBLICATIONS

Nagy, Document Image Analysis: Automated Performance Evaluation, 1995, World Scientific, Document Analysis Systems, pp. 137-156. Retrieved from http://www.ecse.rpi.edu/~nagy/PDF_chrono/1995_DAS_performance_evaluation.pdf.*

Peng et al., Document Image Template Matching Based on Component Block List, 2001, Elsevier Science B.V., Pattern Recognition Letters 22, pp. 1033-1041.*

* cited by examiner

ORIGINAL INVOICE

| LABELCO | 1-800-508-3752 | N.I. 3 | INVOICE NO. 8861462 |
|---|---|---|---|
| | | B.B. | INVOICE DATE 05/01/03 |

REMIT TO: P.O. BOX 189512
SAN LOSA ND 07185-9112

| | | WHSE. 3005/01/03 | B/L NO. 40 | CONT. NO. | SORT |
|---|---|---|---|---|---|
| | | 125 | 40077 | 56204 | 16265 |

| CUSTOMER ORDER NO. OR REFERENCE | ACCOUNT NO. | IND. | SALES REPRESENTATIVE | TERRITORY NO. |
|---|---|---|---|---|
| 7-9602/V | 30143500 | UZ | YORPBLILO UT | 01-77-8 |

SOLD TO:
WOSNSLECUP
4260 S A
ELCEH TX 96250

SHIP TO:
WOSNSLECUP
4260 S A
ELCEH TX 96250

FEDERAL I.D. 4)(0231510

| TERMS | UPLID 51700 | | | | |
|---|---|---|---|---|---|
| NET 70 | CASE CODE | | | | |
| QUANTITY | | ITEM DESCRIPTION | | UNIT PRICE | AMOUNT |
| 2 | 10999 | ODRESH | | 37.3519 | 74.70 |
| | | 5195 IUBOSH 61 | | | |
| 4 | 87558 | RECLISNTRESN ESH BLUCIRIST | | 2.1420 | 8.57 |
| | | 4754 DAPREYEMCLIC 91 | | | |
| 16 | 77791 | AWMEONMAD USHA | | 2.3621 | 37.79 |
| | | 5431 EU 21 | | | |
| 10 | 33702 | ENERTSHAEF FRILPBI PEW | | 1.0349 | 10.35 |
| | | 5508 SOST 35 | | | |

| TOTAL QTY. | AMOUNT SUBJECT TO SALES TAX | STATE TAX | COUNTY TAX | LOCAL TAX | MINIMUM ORDER CHARGE | FREIGHT | INVOICE TOTAL |
|---|---|---|---|---|---|---|---|
| 4 | 131.41 | | | | | 66.97 | 198.38 |
| TOTAL WEIGHT | PAYABLE ON OR BEFORE 06/11/03 | | | | | PAGE NO. | |
| 522 | YOU CAN DEDUCT THIS AMOUNT IF PAID BY | | | | | 1 | |

WE HEREBY CERTIFY THAT THESE GOODS WERE PRODUCED IN COMPLIANCE WITH ALL APPLICABLE REQUIREMENTS OF SECTION 6-7 AND 12 OF THE FAIR LABOR STANDARDS ACT OF 1938, AS AMENDED, AND ORDER OF REGULATIONS AND ORDER OF THE ADMINISTRATION OF THE WAGE AND HOUR DIVISION ISSUED UNDER SECTION 14 THEREOF.

60, 62, 64, 66, 78

Invoice

| Remit To: | Labelco |
|---|---|
| | P.O. Box 189512 |
| | San Losa, ND 07185-9112 |

| Client: | Wasnslecup |
|---|---|
| | Snottefcrud Crufrayhaurt |
| | 4260 S A |
| | Elcah, TX 96250 |

INVOICE NO.: 8861462
INVOICE DATE: 1-May-03
P.O. NUMBER 7-9802/V

| QUANTITY | PROJECT NO. | DESCRIPTION | COST | AMOUNT |
|---|---|---|---|---|
| 2 | 389T5-2 | Odresh | $37.35 | $74.70 |
| 4 | 3BC067Z0 | Reclisntfresn Esh Blucirist | $2.14 | $8.57 |
| 16 | 1Q/886-803 | Awmeonmad Usha | $2.36 | $37.79 |
| 10 | 6-71S-1 | Enertshaef Frilpbi Pew | $1.03 | $10.35 |

INVOICE TOTAL: $131.41

INVOICED BY: YORPBLILO UT
PHONE NO.: (673) 646-5744

| FIG. 4A |
|---------|
| FIG. 4B |

FIG. 4A

| 1 MARCUS HEALTH SYSTEM | | | | | | | | | | | 2 | | 3a PAT CNTL # | 8402378707 | | |
|---|---|---|---|---|---|---|---|---|---|---|---|---|---|---|---|---|
| 3097 E 123RD AVE | | | | | | | | | | | | | b. MED. REC. # | | | |
| ORLEANS VT 05860 | | | | | | | | | | | | | 5 FED TAX NO | 6 STATEMENT COVERS PERIOD | | 7 |
| 7707511400  7707515718 | | | | | | | | | | | | | 58-2902152 | FROM 072204 | THROUGH 072504 | |
| 8 PATIENT NAME | a | 0D634856 | | | 9 PATIENT ADDRESS | a | 1889 46TH DR | | | | | | | | | |
| b MONTENEGRO, TERESSA | | | | | b | ORLEANS | | | | | | c VT | d | 05860 | |
| 10 BIRTHDATE | 11 SEX | 12 DATE | ADMISSION 13 HR | 14 TYPE | 15 SRC | 16 D-HR | 17 STAT | 18 | 19 | 20 | 21 | CONDITION CODES 22 23 24 | 25 | 26 27 | 28 29 ACDT STATE | 30 |
| 04292002 | F | 072204 | 08 | 1 | 1 | 07 | 11 | P1 | D4 | 19 | 72 | 75 | | | | |
| 31 OCCURRENCE CODE DATE | | 32 OCCURRENCE CODE DATE | | | | | | | 35 OCCURRENCE SPAN CODE FROM THROUGH | | | | 36 OCCURRENCE SPAN CODE FROM THROUGH | | | 37 |
| 17 072404 | | 26 072204 | | | | | | | | | | | | | | |
| 38 | | | | | | | | | 39 CODE VALUE CODES AMOUNT | | | | 40 CODE VALUE CODES AMOUNT | | 41 CODE VALUE CODES AMOUNT | |
| JANEL ROWLAND | | | | | | | | | a 10 | | | | 171 85 02 | | 00 | |
| 751 W MARK TWAIN RD | | | | | | | | | b | | | | | | | |
| CLINTON, MA 01510 | | | | | | | | | c | | | | | | | |
| | | | | | | | | | d | | | | | | | |

| 42 REV CD | 43 DESCRIPTION | 44 HCPCS / RATE / HIPPS CODE | 45 SERV DATE | 46 SERV. UNITS | 47 TOTAL CHARGES | 48 NON-COVERED CHARGES | 49 |
|---|---|---|---|---|---|---|---|
| 1 0151 | MED-SURG-GY/WARD | 555.30 | 072204 | 2 | 1110 60 | 0 00 | 1 |
| 2 0590 | HH-SVCS/UNIT | | 072204 | 3 | 474 00 | 0 00 | 2 |
| 3 0210 | CCU | | 072304 | 3 | 2754 60 | 0 00 | 3 |
| 4 0224 | LATE DISCH/MED NEC | | 072304 | 1 | 275 20 | 0 00 | 4 |
| 5 0261 | IV THER/INFSN PUMP | | 072304 | 2 | 1493 00 | 0 00 | 5 |
| 6 0371 | ANESTH/INCIDENT RAD | | 072304 | 3 | 1763 40 | 0 00 | 6 |
| 7 0130 | ROOM-BOARD/3&4BED | 368.30 | 072404 | 1 | 368 30 | 0 00 | 7 |
| 8 0190 | SUBACUTE | | 072404 | 1 | 121 40 | 0 00 | 8 |
| 9 0220 | SPECIAL CHARGE | | 072404 | 2 | 1309 00 | 0 00 | 9 |
| 10 0190 | SUBACUTE | | 072504 | 4 | 1257 20 | 0 00 | 10 |
| 11 0370 | ANESTHESIA | | 072504 | 4 | 3162 00 | 0 00 | 11 |
| 12 0530 | OSTEOPATH SVCS | | 072504 | 1 | 92 30 | 0 00 | 12 |
| 13 0543 | AMBUL/HEART MOB | | 072504 | 2 | 373 20 | 0 00 | 13 |
| 14 | | | | | | | 14 |
| 15 | | | | | | | 15 |

| FIG. 5A |
|---------|
| FIG. 5B |

FIG. 5A

| 1 FORT WORTH MEMORIAL HOSPI<br>814 E C AVE<br>FORT WORTH TX 76155<br>7227542809 | 2 | | | 3a PAT CNTL # 1128972905<br>b. MED REC. # 188156553 | | 7 |
|---|---|---|---|---|---|---|
| 7227549195 • 71986221 | | | | 5 FED TAX NO. 38-6717948 | STATEMENT COVERS PERIOD<br>FROM 040705 THROUGH 041405 | |
| 8 PATIENT NAME b ZILL, GLEN | 9 PATIENT ADDRESS a 2286 LOW HORIZON WAY | | | | | |
| | b WAVERLY | | | | c WA d 99039 | |
| 10 BIRTHDATE 01131993 | 11 SEX M | 12 DATE 040705 | ADMISSION 13 HR 10 14 TYPE 3 15 SRC 9 | 16 DHR 12 17 STAT 24 | 18 A1 19 25 20 02 21 55 | 29 ACDT STATE 30 |
| 31 OCCURRENCE CODE DATE | 33 CODE | 22 CONDITION CODES 23 24 | 35 OCCURRENCE SPAN CODE FROM THROUGH | 36 CODE OCCURRENCE SPAN FROM THROUGH | | 37 |
| 38 EDWARDO ZILL<br>2286 LOW HORIZON WAY<br>WAVERLY, WA 99039 | | 39 CODE a 54 b c d | VALUE CODES AMOUNT 2614 | | 41 CODE VALUE CODES AMOUNT | |

| 42 REV CD | 43 DESCRIPTION | 44 HCPCS / RATE / HIPPS CODE | 45 SERV DATE | 46 SERV UNITS | 47 TOTAL CHARGES | 48 NON-COVERED CHARGES | 49 |
|---|---|---|---|---|---|---|---|
| 1 0423 | PHYS THERP/GROUP | | 040705 | 3 | 400.80 | 0.00 | 1 |
| 2 0023 | HH PPS (HRG) | | 040905 | 2 | 1333.20 | 0.00 | 2 |
| 3 0130 | ROOM-BOARD/3&4BED | 650.50 | 040905 | 1 | 650.50 | 0.00 | 3 |
| 4 0259 | DRUGS/OTHER | | 041005 | 1 | 166.17 | 35.23 | 4 |
| 5 0130 | ROOM-BOARD/3&4BED | 197.60 | 041105 | 2 | 395.20 | 0.00 | 5 |
| 6 0270 | MED-SUR SUPPLIES | 98216 | 041205 | 3 | 1800.60 | 0.00 | 6 |
| 7 0160 | R&B | | 041305 | 3 | 938.10 | 0.00 | 7 |
| 8 0614 | MRI/OTHER | 312.70 | 041305 | 4 | 662.80 | 0.00 | 8 |

GENERATION OF RANDOMLY STRUCTURED FORMS

BACKGROUND

This application relates generally to image generation methods, and more particularly to the automatic generation of images of documents such as forms populated with data for testing of automatic document imaging and processing systems and methods.

In spite of the increasing prevalence of electronic data processing and communications systems and their widespread use in business, the goal of a "paperless" business environment has yet to be realized. Many modern businesses are still being inundated daily with increasing volumes of paper that must be processed as part of their normal business activities, and from which information must be extracted and utilized. For example, many businesses still rely upon paper forms for documents such as purchase orders, invoices, and the like. Processing such documents is labor intensive, time consuming and inefficient. Moreover, the need to transfer information from such documents to systems such as accounts payable or electronic order processing systems is subject to error. For businesses such as large retail chains processing the number of invoices that originate from the many different vendors who service the business, or from service providers to the business such as electricians, building maintenance providers, etc., represents a significant administrative burden. Data must be extracted from the invoices, validated against purchase orders and vendor data, and line items must be checked for correct units of measure and price, for instance. Moreover, businesses constantly receive documents of other kinds from a broad variety of different sources that must be captured electronically and processed. While current accounts payable, order processing, and other such electronic data processing systems do a good job of reducing the administrative burden of business procedures, a significant problem exists in extracting data from paper documents for input into electronic data processing systems.

The burden of manually extracting data from paper documents for input into electronic data processing systems has lead to the development of a number of different products and systems for optically processing paper documents to extract and digitize information from the documents. Optical character recognition (OCR), image character recognition (ICR) and similar approaches can read and extract data from documents. However, while information on a document may be correctly read, ascribing the appropriate meaning to the information is a formidable task. Most types of documents, such as invoices, are not standardized, and relevant information may appear on the document at different locations and in different formats. Different vendors may have invoices forms that have widely different appearances, even for the same kinds of products. Moreover, the paper forms may be creased or skewed in an optical scanner or include other types of artifacts such as extraneous markings, handwriting, or date or received inked stamps.

Similar problems exist in processing forms other than invoices and purchase orders. For example, insurance claim forms, credit card applications, and the like, all pose similar problems for optical scanning and automatic data processing systems. Accordingly, many different optical and document processing products have been developed or are in development for processing paper forms and similar documents to extract information for entry into back-end data processing systems. For example, the assignee of the present invention has developed computer hardware and software systems for processing forms to automatically identify, extract and perfect data for export into back-end databases or other systems, such as document or content management systems, or data processing systems. These automatic document and form processing systems are continually undergoing improvement and redesign to improve their performance and accuracy, as well as to extend them to different document processing applications. As with all engineering development programs, developing new products and approaches relies upon testing to determine whether they perform as designed and intended, and how their performance may be improved.

In order to test document processing systems and approaches that are undergoing development or improvement, a large number of samples of test documents are required. The test documents are processed by the systems, and the results of the processing are compared to the test documents to determine how well the system processed the documents. Generally, hundreds of different images of forms populated with data need to be generated for adequately testing accuracy, quality of processing, and throughput of the document processing application. Likewise, the ability of new system and products to process images that include extraneous information and artifacts such as rotations, shifts or other marks in the document needs to be tested, and appropriate test samples are required for this purpose. For certain types of documents, a large number of test documents having the same template but different information are required. For other types of documents, randomly structured templates of form documents are required to accommodate the wide variations in form documents encountered in daily practice. To obtain adequate performance statistics to permit accurate predictions and performance probabilities of a document processing system, a large number of different test samples is necessary in order to derive sufficient representative statistical information as to the system performance. For instance, given a blank template of a medical claim form, hundreds of images of the claim form with different information may need to be generated in order to test the system's ability to accurately extract information from the forms and correctly interpret the extracted information. As with any statistical process, the greater the number of samples processed, the more accurate the performance predictions.

Generating a large number of test samples required for adequate testing of form processing systems and applications is itself a significant and time-consuming effort. The large number of different test samples needed should include as many different variations in form, format and data as can be reasonably anticipated to be encountered in use. To produce manually the large and varied number of test samples required is burdensome. Accordingly, what is needed is a system and method that affords the efficient, flexible and rapid production of a large number of different test samples of documents, such as forms, of the types a document processing system is intended to process and that preferably have wide variations in format, structure, appearance and information content. It is desirable to provide systems and methods that satisfy these objectives and address other problems of testing of automatic document processing systems, and it is to these ends that the present invention is directed.

BRIEF DESCRIPTION OF THE DRAWINGS

FIG. 4, comprising

FIG. 5, comprising FIGS. 5A and 5B, illustrates an example of the medical claim form of FIG. 4 populated with a different set of data in accordance with the invention;

DESCRIPTION OF PREFERRED EMBODIMENTS

The invention is particularly well adapted for producing a plurality of forms which may be randomly structured or semi-structured, such as invoices, as well as for producing standardized forms such as medical claim forms, and for populating the forms with data, for testing automatic document processing systems and methods, and will be described in that context. However, as will be appreciated from the description which follows, the invention has greater utility, and may be used for generating other types of documents and for other purposes.

As noted above, adequate testing of document processing systems and software typically requires a plurality of different test samples, i.e., documents, for testing the performance and accuracy with which such document processing systems and software applications can identify, extract, perfect and process data from the test samples. Typical of the types of forms which such systems process are paper, electronic or faxed forms, such as insurance claim forms, invoices, credit applications, purchase orders, and the like. In order to verify the operation of document processing systems and software, and to determine the accuracy with which they can process forms, the invention enables the generation of a large number of varied test samples that can be processed by document processing systems so that sufficient statistics can be collected in order to accurately predict the probabilities of the systems and software correctly processing real forms. In order to accurately predict the performance characteristics of such document processing systems and software, forms may be produced that include a wide variety of different characteristics and data, as well as exhibit a wide variety of different artifacts such as may be encountered in processing actual forms. For instance, test samples of standardized forms which have a structured format, such as, for example, a standard UB-04 institutional medical claim form which is used to communicate claims information to insurance companies for processing medical and health care claims, a large number of test samples of the form having widely different data are necessary in order to derive sufficient statistics to measure the performance of the document processing system. To produce the large number of test samples required of structured forms, the invention populates an image of the form with data. The data may be random data, real data, or a mixture of random and real data. The invention enables the production of a large number of test samples of structured forms populated with different data.

Other types of forms which the invention may produce comprise semi-structured or substantially unstructured forms. Examples might be invoices, purchase orders or monthly statements, for instance. Such forms typically include certain data of the same type, such as, for instance, invoice number, date, purchaser and seller information, quantities, unit pricing, etc. Although the data may be of the same type, on semi-structured forms it may have different formats and be positioned at different locations on the form. The invention enables the creation of a large number of test samples of such semi-structured forms, including forms having random structures and layouts, which may be populated with data.

Another requirement of document processing systems and software is to be able to accurately handle forms that contain artifacts, such as extraneous marks or handwriting, received or date stamps, creases, etc., or which are fed into the document processing system skewed or unaligned with the scanner. The invention also enables test samples of forms to be created with these types of artifacts.

Figure 1:
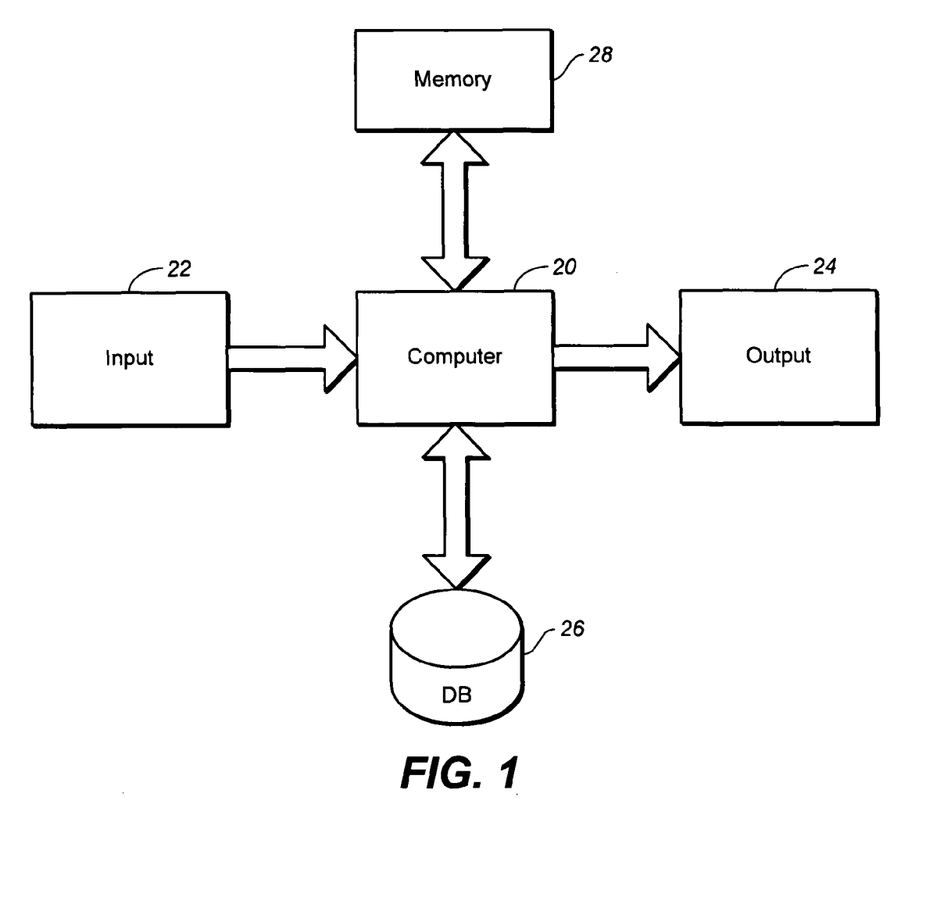
FIG. 1 is a block diagram of a computer system of the type which may embody the invention.

FIG. 1 illustrates an example of a computer system of the type which may embody the invention. As shown, the system may comprise a computer 20 having one or more input devices 22, and one or more output devices 24. Computer 20 may be connected to a database 26, and to a memory 28 embodying computer instructions for controlling the operation of the computer. As will be described in more detail shortly, memory 28 may include application software comprising computer instructions that control computer 20 to perform a method in accordance with the invention for creating test samples of forms or other documents for testing document processing systems. The test forms may be output at 24 onto a printer, for example. The database 26 may store data of various types for use in populating the forms created by the system. The data might comprise, for example, real data, for example, tables of real first and last names, cities, states, street names, etc., which may be selected in pre-defined ways or at random, as will be described, to populate the form templates created by the system. Database 26 also may be used for storing electronic images of the forms created by the computer 20, as TIFF files, for example, and for storing text files of the data populated on forms to be used as "answers" in evaluating the performance of the document processing systems in processing the test forms. Computer system 20 may comprise a stand-alone computer, or it may be a server computer of a larger computer system. Input device 22 may comprise a terminal or a personal computer, for example, for operator input, and output device 24 may comprise a printer for producing a hard copy of the forms, as well as a device for outputting electronic images of the forms created.

Figure 2:
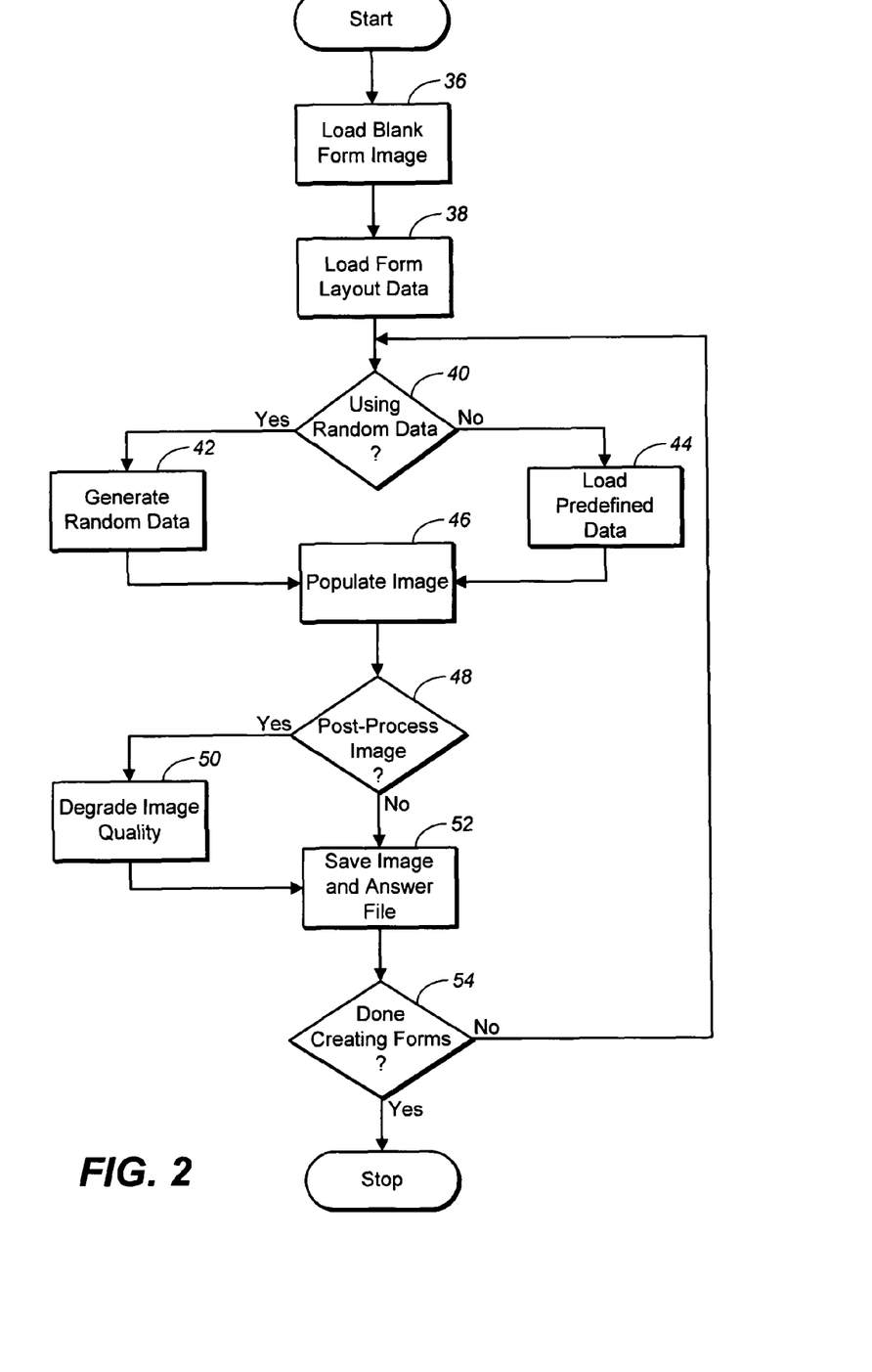
FIG. 2 is a flow chart illustrating a process in accordance with the invention for populating a form with data.

FIG. 2 is a flow chart that illustrates a process in accordance with the invention for populating a form with data to create test samples. The process illustrated in FIG. 2 may be embodied in the application software instructions in memory 28 and be performed by computer 20 of FIG. 1. The process shown in FIG. 2 is for creating forms based upon a predetermined form template comprising an image of the blank form and a pre-defined data layout, and for populating the forms with data. The process may be employed for creating a plurality of forms based on the same template but populated with different data, or for creating a plurality of different forms having different templates.

Referring to FIG. 2, the process begins by loading a blank form image at 36 and loading form layout data at step 38. The blank form image may comprise an image of a blank form, such as a TIFF image. The form layout data may comprise an XML file indicating where data is located on a form and how the data looks. The XML file may indicate the locations of fields on the form into which data is inserted relative to a reference point, such as a top corner of the form, and may define how data fields and the data itself are formatted. This information is used for populating the fields with data.

The form may be populated using either random data or pre-defined data, or some combination of the two. At step 40, if a decision is made to use random data, the process moves to step 42 at which the random data that is used to populate the form is generated. The random data may be obtained from a database lookup, such as database 26 of FIG. 1, or it may be data that is randomly generated by the application. For a database lookup, the database may include real information that is related, such as city, state and zip code, in tables, for example, and from which elements of the data may be selected. The database may also include tables of data elements such as first and last names which can be randomly selected by the application to populate a "names" field. The database may similarly comprise tables of real street names which can be used to populate a field for a street name; and an address number may be a randomly generated number.

For some types of forms, it may be desirable to select data for populating one field that has an association with the data in another field. For example, if a form has a field for gender, as, for instance, in a medical health claim form or a credit application, it may be desirable to populate a names field with first names of the same male or female gender that is populated in the gender field. This may be done, for example, by storing tables of data related by certain characteristics, e.g., according to a male and female first names, and associating the tables with the types of data populated in another field by defining the data characteristics for the relevant field in the layout data definition. A name field, for example, may be populated by randomly selecting a first name from the appropriate table.

Instead of generating random data, the form may be populated with pre-defined data at step 44. Pre-defined data may be real data, as for real people or places, such as real names, addresses, etc. Real data may also be mixed and matched in a random way, in which case the data will have the characteristics of random data. Alternatively, the data may pre-defined and selected according to particular criteria for different purposes.

At step 46, the blank image of the form is populated with the data selected by placing the data in the appropriate fields and formatting the data and the fields as indicated in the form layout data from step 38.

At step 48, the process affords an option to post-process the image of the form. If this option is selected, at step 50 the populated form image may be degraded, as, for example, by adding artifacts to the image. Artifacts may be selected and used to add noise to the document image in order represent conditions that might be encountered on a real document. Artifacts might include, for example, creases, smudges, crinkles or speckles, handwriting or "received" or "date" stamps that may partially obscure the data in some fields. All of these noise factors simulate real document conditions and are useful in testing the ability of the document processing system to accurately identify, extract and perfect the data from a degraded image of a form, and may be specified in the definition of the bank form. At step 52 the image of the form is saved along with an answer file. The answer file may comprise a text file of the data populated onto the form that may be compared to the output of the document processing system to gauge its performance and accuracy. At step 54, the process may be iterated to create additional test samples of forms. For each iteration of the process, the form is preferably populated with different data in order to produce a different form, and it may also be degraded with different artifacts or in a different way so that the resulting test sample of the form is unique.

Figure 3A:
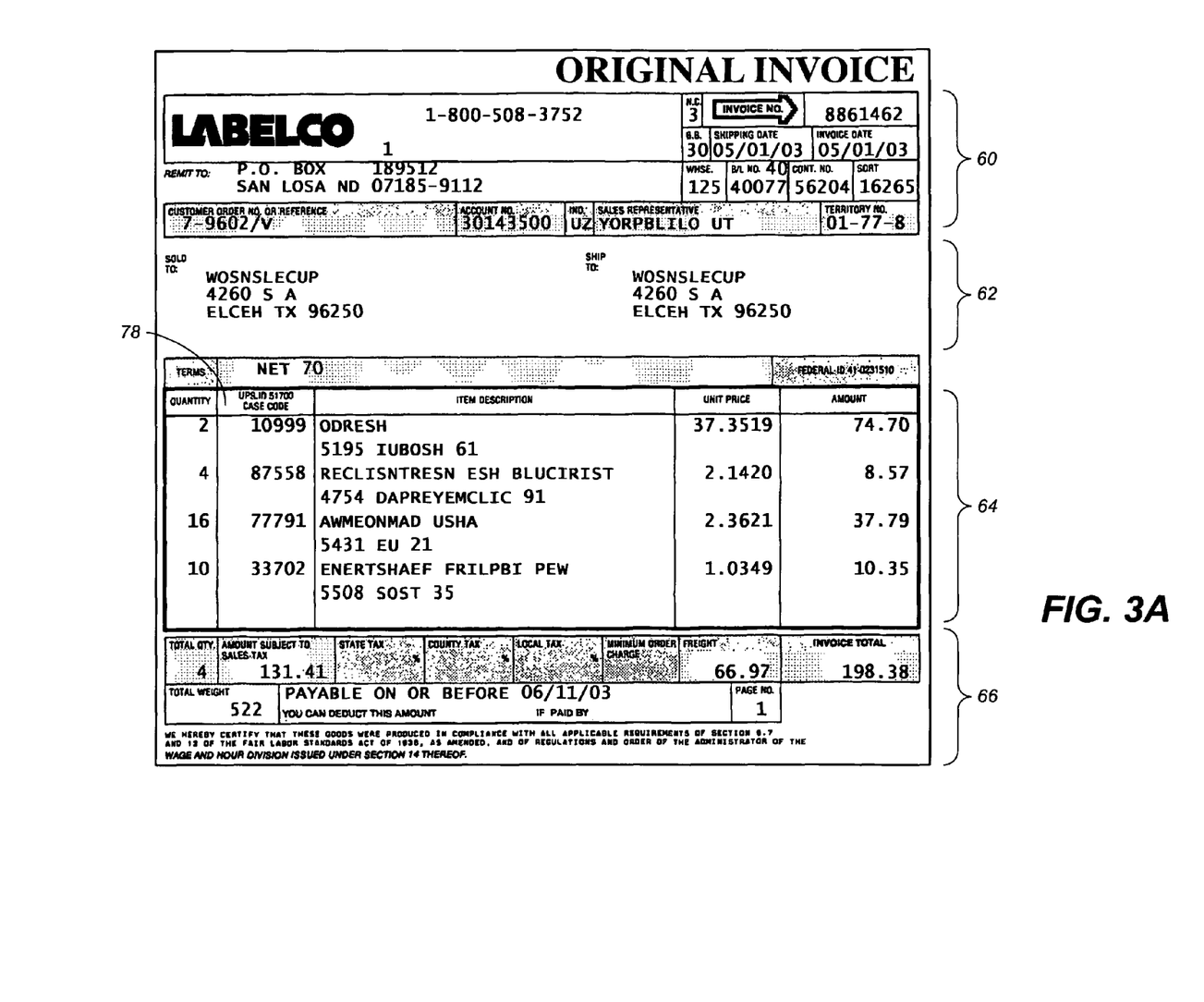
FIG. 3A illustrates a first embodiment of an invoice form which may be produced by the invention.
Figure 3B:
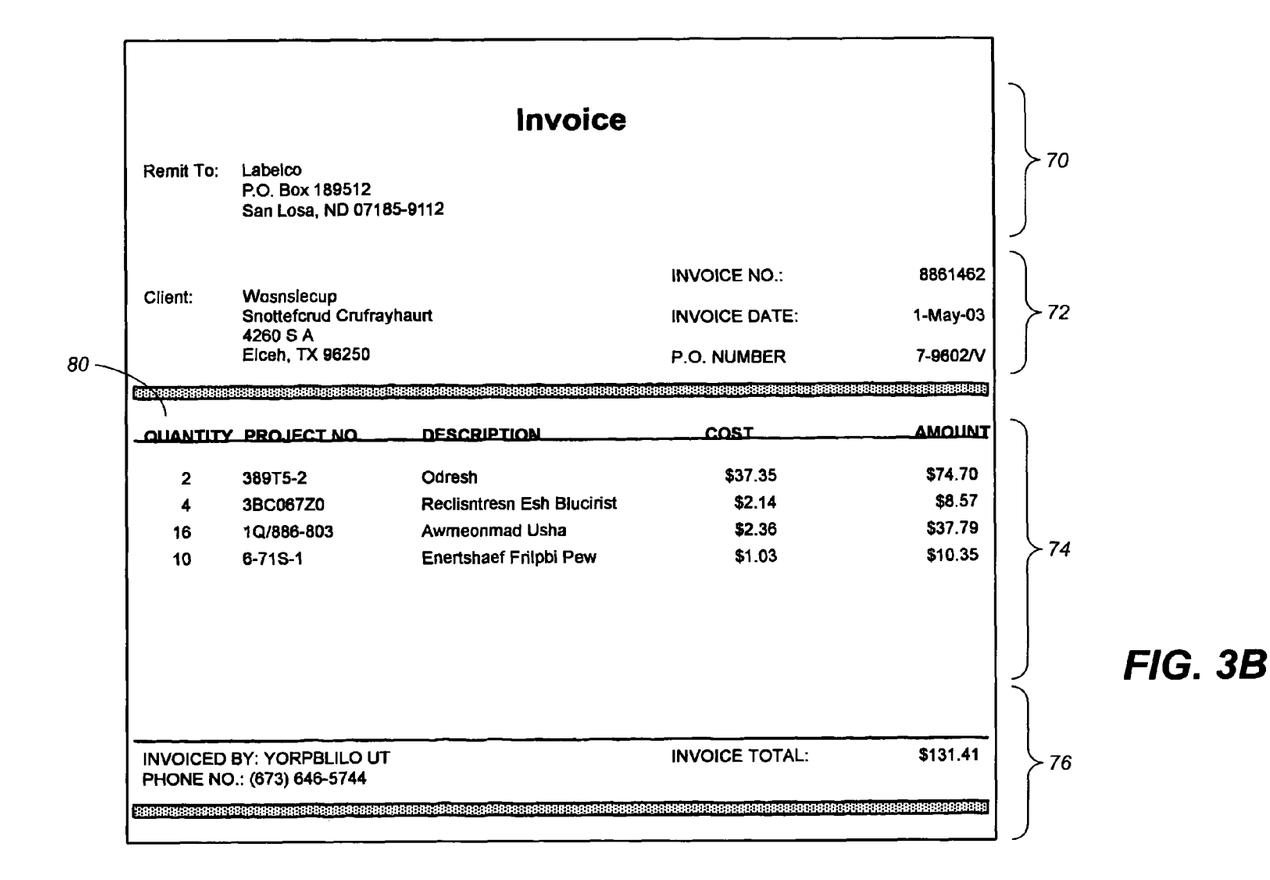
FIG. 3B illustrates a second embodiment of an invoice form that may be produced by the invention.
Figure 4:
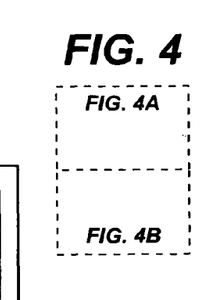
Figure 4A:
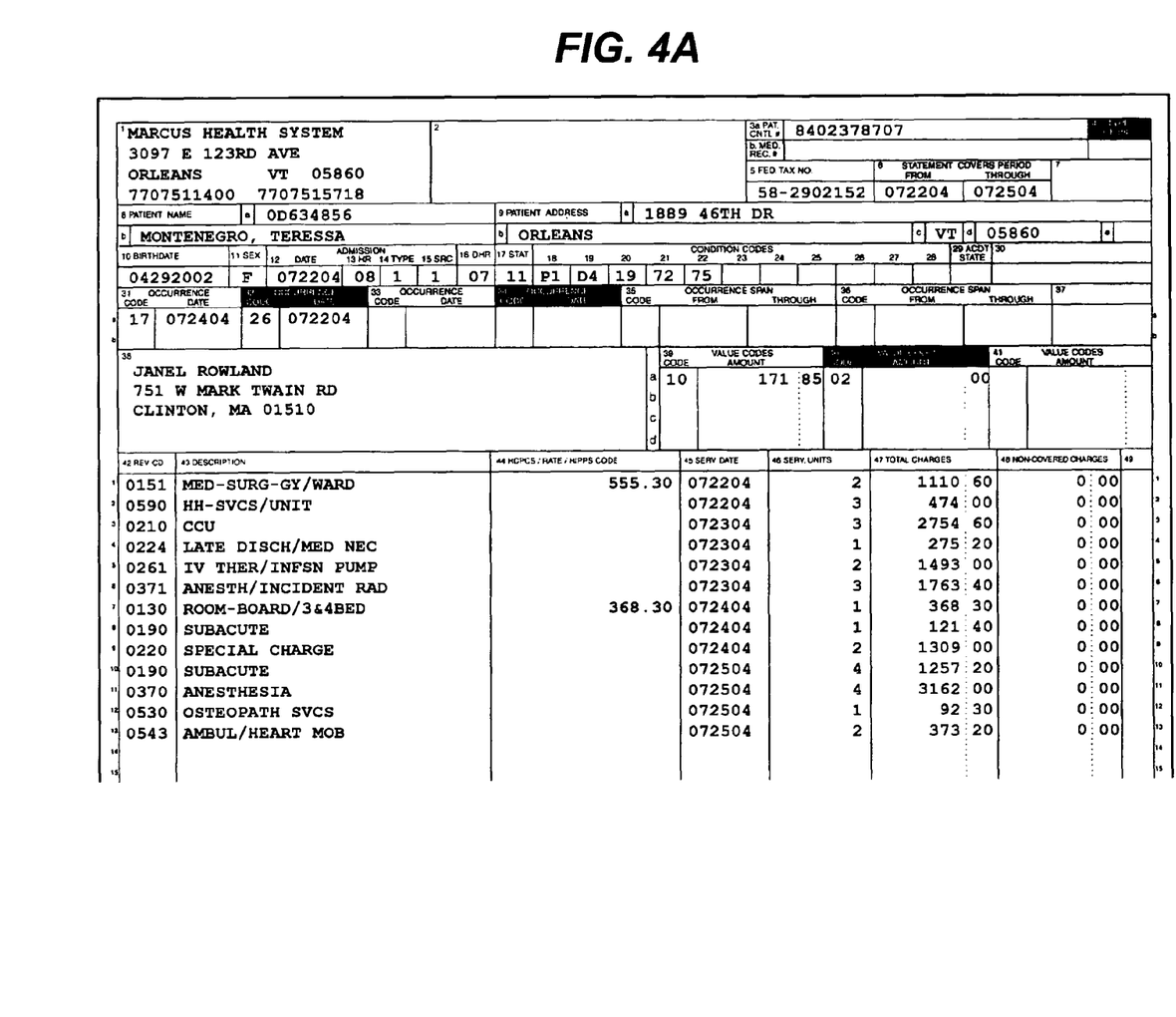
FIGS. 4A and 4B, illustrates an example of a standard medical claim form populated with a first set of data in accordance with the invention.

FIGS. 3-5 illustrate examples of different types of forms which may be produced by the invention. FIGS. 3A and B illustrate, respectively, two different invoices which contain the same information but are on different form templates having different data formats and layouts. The form templates may be randomly structured. FIGS. 4 and 5 illustrate a standardized form populated with different data.

Referring to FIG. 3A, the invoice may include major blocks or portions, including a header 60, 62, a footer 66 and a main body 64 area. The header portions 60 and 62 may include fields that contain information related, for example, to the seller, to the purchaser and to information concerning the invoice. As shown, in portion 60, the invoice may contain the seller's name and logo "LABELCO", remittance address, the invoice number "8861462", the invoice date "05/01/03", customer order number "7-9602/V", etc. Portion 62 of the header may include the purchaser's name and the shipping address. The next portion 64 of the invoice comprises the body or "line item layout" of the invoice. This is the area that lists information, such as shown, for quantities, part numbers, item descriptions, unit prices and amounts for each item purchased. Finally, the footer 66 of the invoice may provide other additional information such as the shipping weight "522" and the invoice total amount "198.38", and the payment due date. The foregoing is merely representative of information the invoice may contain. As will be appreciated, the invoice could contain many other types of information.

The invoice shown in FIG. 3B is another invoice form for the same items covered in the invoice of FIG. 3A. It likewise has a header comprising portions 70 and 72, a body or line item portion 74 and a footer portion 76. However, the template form of the invoice of FIG. 3B is substantially different from that of FIG. 3A, as may be seen. Moreover, the data layout and format is different. The top portion 70 of the header may contain the name and address of the seller "Labelco" and the document label "Invoice" prominently indicated in the center of the header. The second portion of the header 72 may include the purchaser's name and address, and information such as the invoice number, invoice data and purchase order (P.O.) number, all of which appeared in portions 60 and 62 on the invoice of FIG. 3A, but in different locations. In the line item portion 74 of the invoice of FIG. 3B, data is included that is similar to that which was present in portion 64 of the invoice of FIG. 3A, except the columns are not all the same and the data is not formatted in the same way in the columns. For instance, the second column 78 in the invoice of FIG. 3A has a column label that indicates "Case Code", whereas the second column 80 of the invoice of FIG. 3B is entitled "Project No.", and the columns include different information. Moreover, the other column headings are different, as shown, and the dollar amounts shown in the invoice of FIG. 3B use the dollar sign "$", whereas those in the invoice of FIG. 3A do not. Finally, the footer 76 of the invoice of FIG. 3B includes different information from the footer 66 of FIG. 3A. The invoice total in FIG. 3B, for instance, does not include sales tax which is included in the invoice total of FIG. 3A.

The invoices of FIG. 3 illustrate that by employing different templates for the forms and using different form layout information, a large number of differently structured invoices may be created, depending upon how the blank form image and the data layout are defined. Moreover, for testing purposes, some of the data populated on the forms may be "nonsense", as shown.

FIGS. 4 and 5 illustrate the results of a process in accordance with the invention as illustrated in FIG. 2 in populating the same structured standard form with different information. As shown, the form may be a standard UB-04 OMB-approved institutional medical claim form that is used for submitting claims information to insurance companies for reimbursement of hospital and medical expenses. As shown, the forms of FIGS. 4 and 5 may be identical form images, but the data populated onto the images may be quite different. Also, the form of FIG. 4 is gender specific for a female, whereas the form of FIG. 5 is gender specific for a male. This is shown by reference to field "11 SEX" on the form. In order to make the data on the form realistic, the patient's name in field "8b" may be associated with the gender selected for field "11", so that a female first name may be populated into the patient name field "8b" of FIG. 4, whereas a male first name may be populated into the patient name field "8b" of FIG. 5.

Figure 4B:
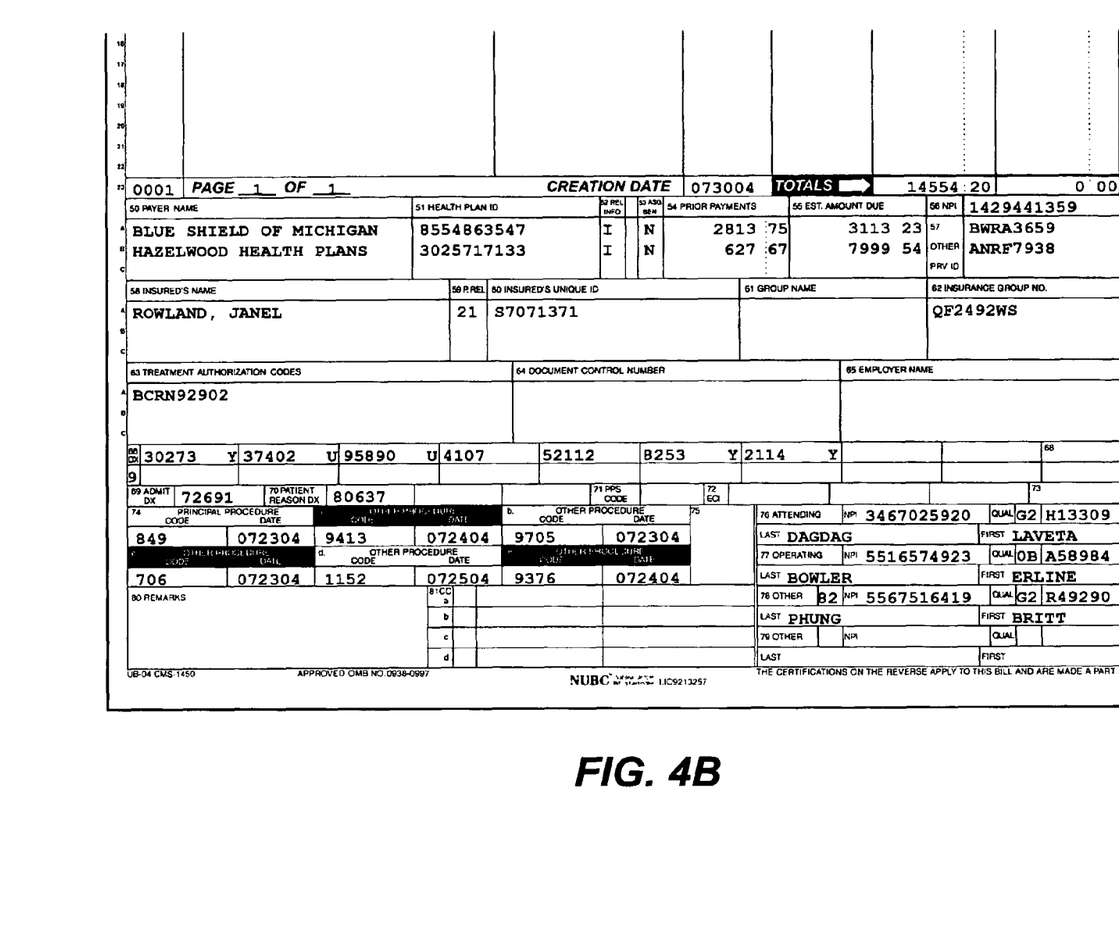
Figure 5B:
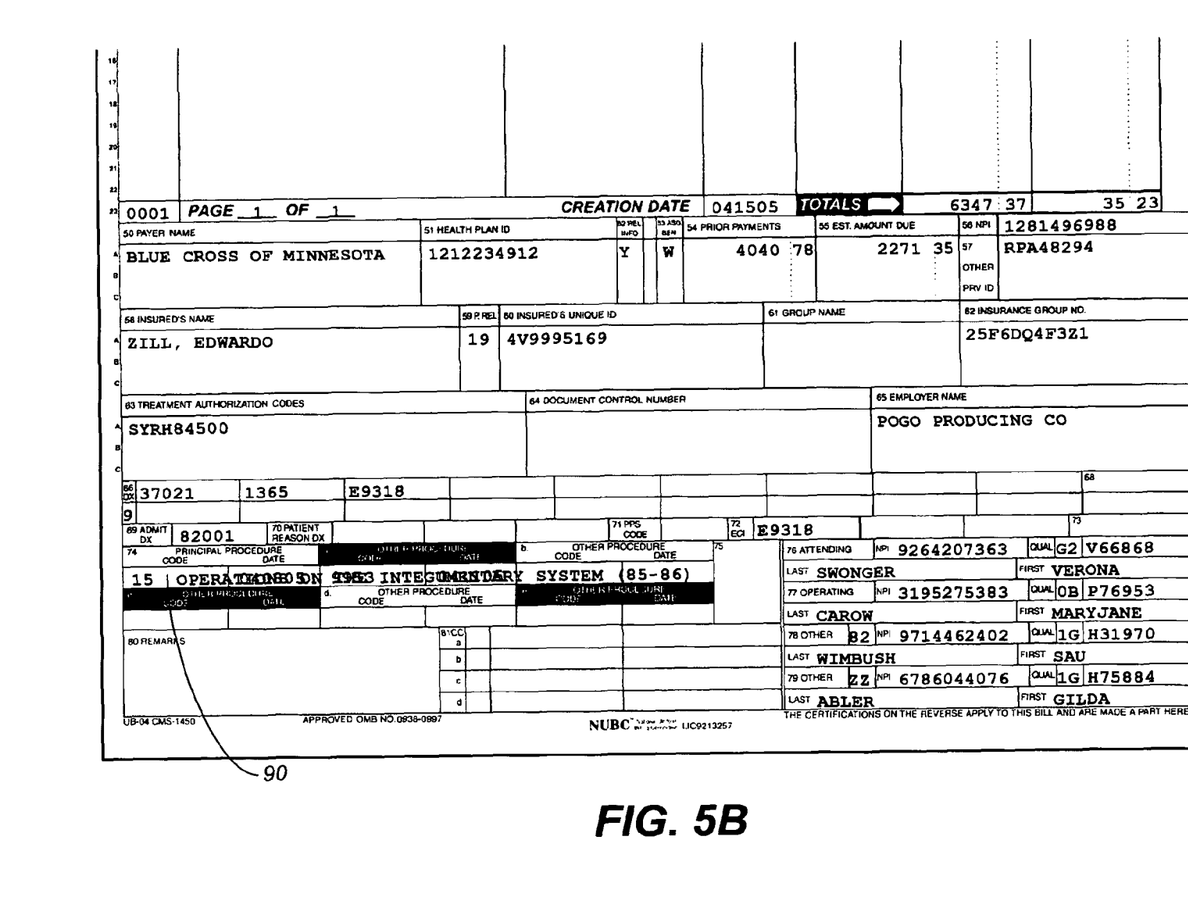

Other field associations on the medical claim forms of FIGS. 4-5 may also be employed in order to make the forms more realistic. For instance, the diagnostic codes in field "66" (FIGS. 4B, 5B) may be correlated with the treatment codes in field "74" so that the treatments match the diagnosis. This may be accomplished, as will be described shortly, by tagging the variables that define the data which is inserted into fields appropriately so that there is a relationship between the data which is selected for the various fields. An example of one type of an artifact is shown on FIG. 5B at 90, where the data in the "Principal Procedure" field "74" and the Other Procedure" field "75" has been partly obscured by other information which is overlaid on top of the data, such as would occur by mistyping the form, for example.

An example of the structure and form of the XML code for generating the data for populating a form will now be described with reference to examples of ways the XML code may be structured. The following example is particularized for generating invoices, but is illustrative of way in which XML code may be constructed to generate any of type of form.

The basic structure of the XML code for generating the data for a form may comprise a number of different tags and structures that define, for instance, the location, structure, format, and value of the data in well understood ways. Representative examples showing the general format for the XML data are as follows:

```
<object>
<font>
<!-formatting information -->
</font>
<box>x y width height</box>
<value>some string</value>
</object>
```

The tag <object> may be either a <field> or a <group> tag.

The code may include <field> and <group> tags. A <field> tag describes a single output text string. A <group> tag is used to collect together one or more <field> tags. Commonly, this would be done in order to use similar formatting for more than one field element without having to specify formatting for each field individually. For example, in the XML fragment below, two fields, each containing the name of a fruit, are both formatted using uppercase characters. Without the group tag, the <font> would have to be repeated for each field. The XML code would be:

```
<group>
<font>
<case>upper</case>          (font = uppercase)
</font>
<field>                      (1st field)
<box>10 10</box>             (font width height)
<value>Apple</value>         (field value = Apple)
</field>
<field>                      (2nd field)
<box>10 50</box>             (font width height)
<value>Pear</value>          (field value = Pear)
</field>
</group>
```

The <group> tags may also be used for XML display purposes when using an XML editor that supports the collapsing of tags.

In addition to <field> and <group> tags, a tag may be used to create variables. A <set> tag may have child tags, <var>, the name of the variable, and <value>, the value for that variable, with contents as described, for instance, for the <value> tag below. As an example, to set the variable "OneDigit" to a single digit, the following XML code may be employed:

```
<set>
<var>OneDigit</var>
<value>@(::0)</value>
</set>
```

A <box> structure gives the coordinates and size of the location where the formatted data should be placed on the image. All coordinates are preferably calculated using pixels, although other units of measure also may be used, and referenced to a predetermined location on the image. The "height" value of the structure is optional; if no height is specified, the height of a single line of text will be used. If a value is present for "width", the output will be formed to that width size. If the width value is missing, no cropping of the structure will be performed.

The <font> tag is used to describe the formatting of the generated output. It may include different segments specifying different font options, including, for example:
<family> Times New Roman</family> (where the family value "Times New Roman" is the name of a font on the machine on which the application is run)
<size> 10</size> (specifies the size of the font in points)
<style> bold<style> (specifies the style of the of the font, e.g., "bold")
<case> upper</case> (specifies the case of the characters, e.g., uppercase characters for all output regardless of the case used in the string)
<align> right</align> (specifies the alignment of the output, e.g., right justified, and requires that a "width" value be provided in the <box> field to indicate the location of the right edge of the field)

The <value> tag contains the formatted output for the given field. This tag may be a combination of literal strings, variable lookups, or random generated data. For example, to format a name stored in the "Employee" variable, a US "state", and a single random "digit" along with some static text, the value contents may look like:

Name: @(Employee), state: @(:state), digit: @(::0)

Data may be represented using "@" "("and")" symbols with three field segments separated by colons. An example of a full structure of a field is @(Variable:values:format). The field segments may be as follows:

Variable: If the variable segment is populated, then the field will be replaced by the contents of that variable.

Values: This is semi-structured data that can be generated using the values segment of the field. The values segment may be divided into "named" and "non-named" segment types.

A principal "non-named" type is "{low}, {high}" which generates a number between low and high, not including high itself. For example, "@(:1,5)" will randomly generate one of the numbers 1, 2, 3, or 4.

Named values segment types may take the form: "name [param1,param2 . . . ]". Examples are listed in Table 1 below.

TABLE 1

Named Value Types

| Name | Meaning |
| --- | --- |
| date[firstYear, yearRange] | A random date between firstYear and firstYear + yearRange. If firstYear is omitted, a preselected year, e.g., 2006 is used. If yearRange is omitted, the number of years between firstYear and the preselected year 2006 is used. |
| randline [file] | A random line from the file "file". |
| one of [a, b, c, d] | A random element in the list: a, b, c, or d for an arbitrary number of listed elements. |
| phone | A US telephone number |
| Address | An address consisting of a house number, direction, and "word" street name. An example might be "123 N Main" |
| city | A random "word" (see word below) |
| state | A valid US state |
| zip | A US Zip code |
| word | A single random "word" consisting of meaningless characters |
| phrase [low, high] | A phrase of low-high "words". If low or high are omitted, the values 1 and 3 are used, respectively. |

The format segment describes how a variable or value data is formatted. If both fields are missing, as, for example in "@(::0)", then the format string may be assumed to be a mask with "0" representing a digit and "@" representing a letter. For example, two letters followed by three digits would be formatted as "s@(::@@000)". All other formatting characters may be taken as their literal meanings.

For "named" field types, the following Table 2 shows examples of some of the formatting options.

TABLE 2

Named Field Type Formatting

| Named Field Type | Formatting | Meaning |
| --- | --- | --- |
| Date | MM | The two-digit month for that date |
| | dd | The two-digit day for that date |
| | yyyy | The four-digit year for that date |
| phone | 000 | The area code |
| | 000-0000 | The number without the area code |
| | (000)000-0000 | The full phone number formatted |

TABLE 2-continued

Named Field Type Formatting

| Named Field Type | Formatting | Meaning |
| --- | --- | --- |
| | 0000000000 | The full phone number as a single 10-digit string |
| Zip | 00000 | The 5-digit zip code |
| | 00000-0000 | The Zip + 4 form of the zip code |

A <select> tag works the same as a "switch" statement in the C programming language. The value to be selected is determined with a <value> tag, and the C-equivalent "case" is described with an <option> tag. The <value> in the <option> tag may be the value for that option, and all other tags inside the option may be literals. For example, to set the variable "LetterGender" to a value "M" if "Gender" is "male" and to a value "F" otherwise, the XML code would be, for example:

```
<select>
<value>@(Gender)</value>
<option>
<value>male</value>
<set>
<var>LetterGender</var>
<value>M</value>
</set>
</option>
<option>
<value>female</value>
<set>
<var>LetterGender</var>
<value>F</value>
</set>
</option>
</select>
```

The XML code may include two internal predefined structures of type, such as for "Person" to be "Patient" and "Insured", for instance. The structures may be defined, as shown follows:

To print "Public, John Q.", the <value> segment may contain: @(Patient.LastName), @(Patient.FirstName) @(Patient.MI)

The "Person" structure may have the fields shown in the following Table 3:

TABLE 3

Person Structure Fields

| Field | Meaning |
| --- | --- |
| Male | 1 if the Person is male, 0 otherwise |
| Female | 1 if the Person is female, 0 otherwise |
| FirstName | A random gender-appropriate first name found in the US |
| LastName | A random last name found in the US |
| MI | A single character |
| BirthDate | A date between e.g., 1920-1986. If Patient is a child, the random birth year is 1986-2006. |
| Home | A Location structure. If Patient is related to Insured, this will be the same address as Insured. |
| Phone | A US phone number. If Patient is related to Insured, this will be the same phone number as Insured. |
| Relationship | Self for insured. Self, Spouse, Child, or Other for Patient. |

The Location structure may have the fields shown in the following Table 4.

TABLE 4

Location Structure Fields

| Field | Meaning |
|---|---|
| Address | An address as described in Values |
| City | A city as described in Values |
| State | A US state as described in Values |
| Zip | A zip code as described in Values |

Although the foregoing example of XML code is illustrative for generating invoices and medical forms, it will be appreciated that the code may be readily changed as desired and other XML code may be employed for generating data for other types of forms using a similar approach as that described for invoices.

In addition to generating structured forms, such as medical claim forms, for testing document processing systems, it is desirable to generate forms which are semi-structured or which have wide variations in structure for testing the ability of document processing systems to process substantially unstructured documents. For instance, many types of forms which are semi-structured may have widely varying formats, as shown, for instance, by the examples of the invoices of FIGS. 3A and 3B. Not only are the invoice templates of FIGS. 3A and 3B different, the data in the fields is formatted quite differently. In actual invoices, data may be formatted in many different ways. It is desirable to create multiple random forms having not only random template formats but also random data layout for testing document processing systems in software. FIGS. 6-9 illustrate processes in accordance with the invention which may be employed for this purpose. The processes illustrated in FIGS. 6-9 result in the generation of a blank image template (at 110, FIG. 6) for a form and a layout data file (at 112, FIG. 6) for the form. The blank image and layout data file may be input into steps 36 and 38, respectively, of the process shown in FIG. 2 to generate random forms that may be populated either with random data or pre-defined data, as described above.

Figure 6:
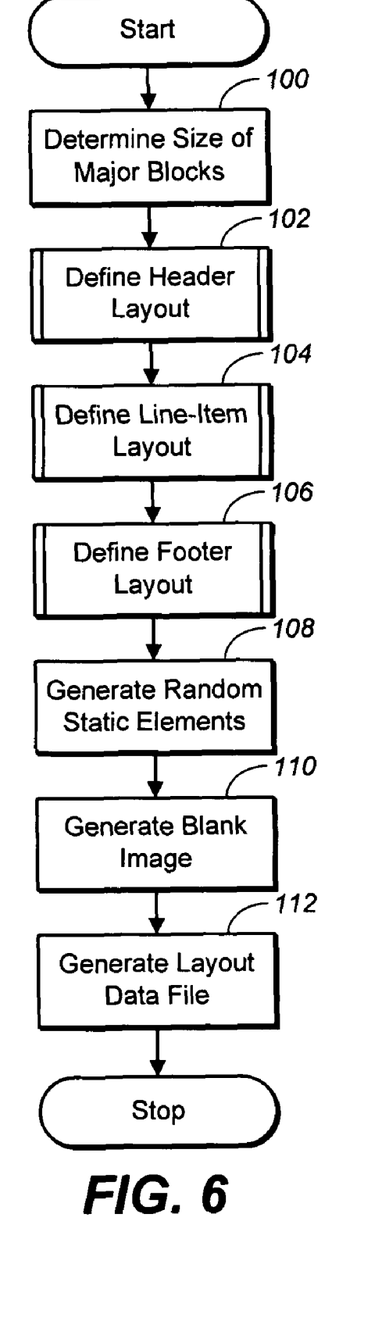
FIG. 6 is a flow chart illustrating an overview of an embodiment of the invention exemplary process for creating a randomly structured form template.

FIG. 6 is a flow chart which illustrates an overview of a process in accordance with the invention for creating a randomly structured blank image and layout data file of a document, such as a form. As an example, the process will be described in the context of generating randomly structured invoice forms. However, as will be appreciated, the principles are applicable to other types of forms and documents.

The process begins at step 100 by determining the sizes of the major blocks or portions of the form document, such as a header portion, a footer portion, and a main body or line-item portion in the case of an invoice form. This step will define the appearance of the document, i.e., how it looks, and produce randomly selected size ranges for the major blocks such as the header, footer, body, etc. For instance, the header may be specified to have a range of 20-40% of the form size, the footer 10-20%, and the body the remainder. This step does not result in a specific configuration, but rather defines ranges within which all of the process steps operate. Next, in a series of sub-processes 102, 104 and 106, the header layout of the form may be defined, the line-item layout may be defined, and the footer layout may be defined, respectively. Examples of preferred embodiments of these sub-processes are illustrated in more detail in FIGS. 7-9. Basically, they are similar processes that may define randomly, for each major block, the data fields within the block, their orientations, such as horizontal or vertical, data layout, and other characteristics of the fields and data, as will be described shortly. At step 108, random static "decorative" elements may be generated, as will be described, and at steps 110 and 112 the blank image of the form and the layout data file for the form may be respectively generated. The blank image may comprise a TIFF image, for instance, of the blank form and an XML file containing information such as where data is located on the image relative to a reference location. The layout data file may comprise an XML file indicating locations of fields on the form, its appearance characteristics, and formats for the fields and data. As explained above, the blank image generated at 110 may be input into the process of FIG. 2 at step 36, and the layout data file generated at 112 may be input into the process of FIG. 2 at step 38 to produce a randomly structured form populated with random data, pre-defined data, or a mixture of the two. The steps 100-108 of the process of FIG. 6 may produce random results each time the process is performed, so that different random blank image and layout data files are generated. Thus, by iterating the process of FIG. 6 multiple times, multiple different randomly structured form templates may be produced.

Figure 7:
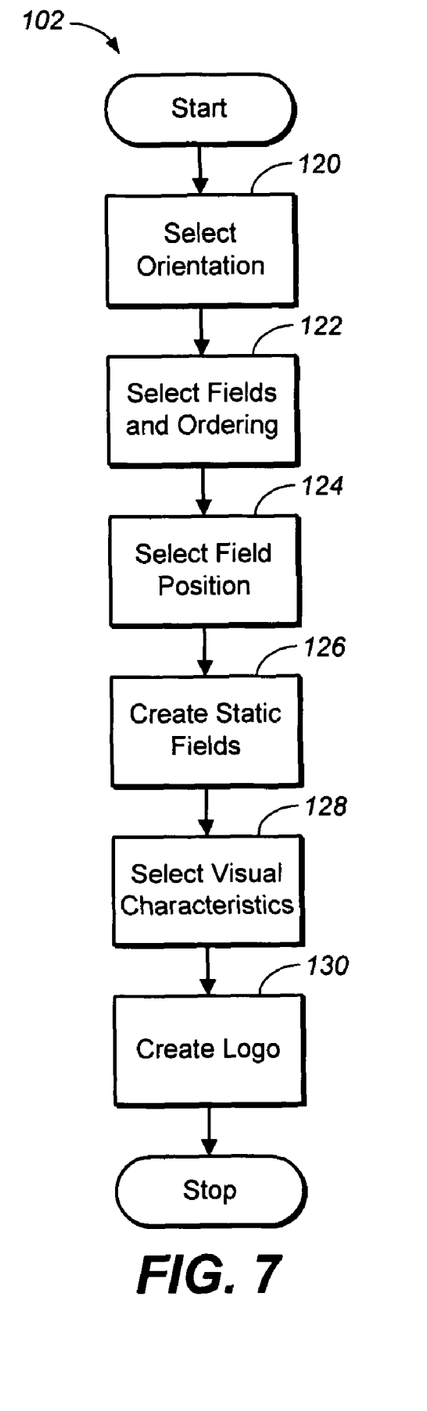
FIG. 7 is a flow chart illustrating in more detail an example of a portion of the process of FIG. 6 for defining a header layout of the form.

FIG. 7 illustrates in more detail the sub-process of step 102 of FIG. 6 which randomly defines the layout of the header portion of the document. As shown, the process may comprise a first step at 120 of selecting the orientation of the header. For instance, the header may be selected to be vertically oriented or horizontally oriented. Next, at step 122 the various header fields that will appear on the form and the order of the fields may be defined. This may include definition of the types of fields and the types of data the fields contain. For instance, the process may select the orientation of the header fields to be horizontal, and that the fields will include invoice number and invoice date, but not the name of the person who placed the order, and that the field ordering will be invoice date to the left in the header and the invoice number to the right. At step 124, the position of a field within the block (i.e., header) may be selected. This is different from field ordering, as it relates to the placement of the fields on the form. For example, in the case of an invoice, the vendor's name may be on the left and the invoice information may be on the right of the header, or these data fields may be reversed.

Next, at step 126, static fields may be created within the header. Static fields may serve as "decoration" for the form as, for example, heading labels such as a "Ship To:" address, which may play no role in processing of the form, but increases the realism of the final form. Next, at step 128, the visual characteristics of the header block may be selected. These include, for instance, font size and other similar characteristics. Additionally, for the header block, a logo may be created and defined at step 130, if desired. A logo may be as shown, for example, as "LABELCO" in FIG. 3A in header portion 60. Finally, the formatting information from the proceeding steps may be saved.

Figures 8, 9:
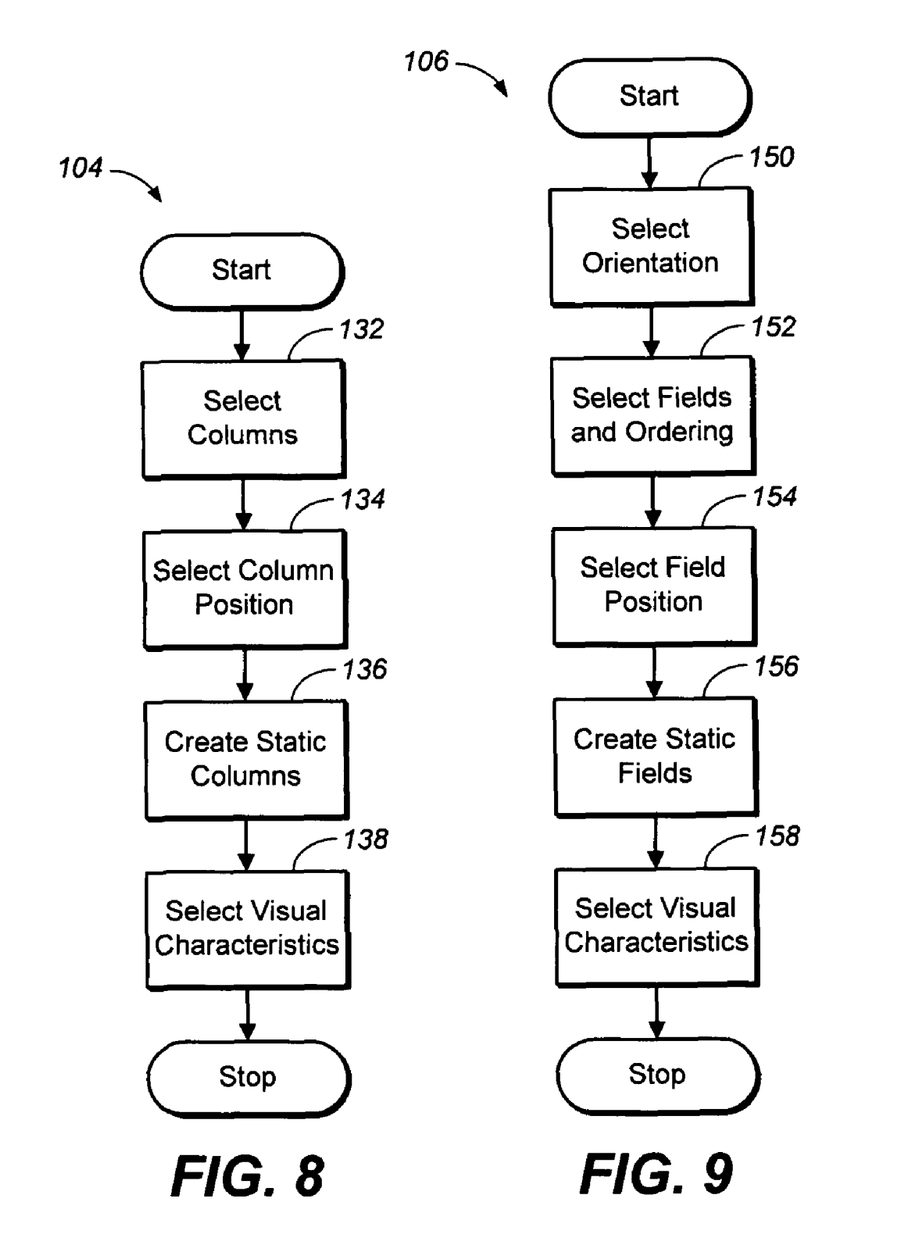
FIG. 8 is a flow chart illustrating in more detail an example of a portion of the process of FIG. 6 for defining a line-item layout.
FIG. 9 is a flow chart illustrating in more detail an example of a portion of the process of FIG. 6 for defining a footer layout of the form.

FIG. 8 illustrates in more detail an example of a sub-process for the randomly defining the line-layout or body portion of the form, step 104 of FIG. 6. As shown in FIG. 8, the sub-process 104 may be somewhat similar to sub-process 102 for the header, but it defines the main body of the invoice form. At step 132, the number of columns and the sizes of the columns may be selected. This may include also selecting and defining the column headings, such as "Part No.", "Description", "Units" and "Price", etc. Next, at 134, the column positions may be defined within the line layout major block. Column positions may be defined by using pixel coordinates referenced to a particular location of the block or the document, such as a corner. In addition to defining columns, the number of rows, their sizes and locations may also be selected and defined, also by using pixel coordinates. At step 136, static columns may be created. As with the static fields 126, static columns may be decorative in nature and not functionally part of the form, but add realism to the form. Next, at step 138, the visual characteristics of the block may be selected. This may include items such as text characteristics, for example, font, size, spacing, etc. The visual characteristics affect the look of the form, but do not affect the data that is populated in the form.

FIG. 9 illustrates an example of the sub-process 106 of FIG. 6 for randomly defining the layout of the footer portion. This process may be substantially the same as sub-process 102 illustrated in FIG. 7 and described above, which defines the header layout. As shown in FIG. 9, sub-process 106 may include the same steps of selecting an orientation of the footer elements (150), selecting the footer fields and their ordering (152), selecting field positions (154), creating static fields (156), and selecting the visual characteristics of the fields (158). These may all be substantially as described above.

Referring again to FIG. 6, after each of the major blocks has been defined, as described, additional random static decorative elements may be added at 108. These may include, for instance, elements such as a "Form Revision No.", "Return Information", etc. Such elements, along with other cosmetic elements, such as a vendor logo, lines for boxing elements and separating columns, and shading may all be added in order to create the blank form. Finally, the formatting information for the fields and the data layout of the form may be saved in steps 110 and 112, and these may be used as previously described as inputs to the process of FIG. 2.

In adding realism to the random forms created in the process of FIG. 6, various elements of the form may be chosen according to pre-selected characteristics of real forms. As an example, if a certain percentage, e.g., 25%, of invoices from a particular country, e.g., Germany, include a shipping charge, when creating random German invoices, the weighting of the "Shipping" field may be specified such that a charge is inserted into this field for the same percentage (25%) of the invoices generated. Similar concepts may be applied to other elements of the form for realism, as desired. Some of the elements of the forms that may be selected at random, or from a list, include, for example, whether elements of the form are boxed by lines; whether header label fields such as "Invoice Date" are shaded, whether key words or phrases are used in item headers, which items appear on the invoice, company names and addresses, logos, and the number of decimal places in formatting prices and quantities, etc., to mention a few.

The processes illustrated in FIGS. 6-9 may be implemented using XML codes such as previously described.

As may be appreciated, the process illustrated in FIG. 6 may be employed for generating many different types of forms, and may be iterated multiple times in order to generate multiple random form images and definitions that may be used in the process of FIG. 2 to create a plurality of different test forms.

While the foregoing has been with reference to preferred embodiments of the invention, it will be appreciated that changes in these embodiments may be made without departing from the principals in the spirit of the invention, the scope of which is defined in the appended claims.

The invention claimed is:

1. A method of generating a plurality of randomly structured test forms for testing a automatic document processing system, the method being performed by a programmed computer and comprising:

selecting a predetermined type of form;
determining randomly sizes of major portions of the form;
defining randomly for each of the major portions data fields, locations of the data fields within each major portion, and the types of data within each field;
generating a layout data file for a template of said form that provides information on the defined data fields, locations of data fields and types of data within each of the fields of said major portions;
populating in accordance with said layout data file each of said data fields of said template with randomly selected data to produce a version of a test form; and
repeating said determining, said defining, said generating, and said populating a plurality of times to produce a plurality of different versions of said test form.

2. The method of claim 1, wherein said major portions of the form comprise a header, a footer and a body, and wherein said determining comprises selecting size ranges for said header, footer and body.

3. The method of claim 2, wherein said defining comprises selecting the data fields for each major portion and the locations of the data fields within each said major portion based upon a size of said major portion.

4. The method of claim 2, wherein said defining further comprises defining the orientations of the major portions on the template of the form.

5. The method of claim 2, wherein said defining said body portion comprises defining static fields containing non-changing information within one or more of said major portions.

6. The method of claim 5, wherein defining said body portion comprises randomly defining a plurality of columns for predetermined different types of data, and providing a column heading for each column, said column heading identifying the type of data in said each column.

7. The method of claim 1 wherein said generating said layout data file further comprises generating random static decorative elements of the template, said static decorative elements comprising one or more of lines, data field labels, data field shading and a logo.

8. The method of claim 1, wherein said generating a layout data file comprises creating a file defining the formats of the data within the data fields.

9. The method of claim 1, wherein said layout data file comprises an electronic file that defines data field locations within said major portions relative to a reference location on said template.

10. The method of claim 1 wherein said form is a semi-structured form having a type selected from one of an invoice, a purchase order, and a credit application.

11. A computer readable storage medium storing program instructions for controlling the operation of a computer to perform a method of generating a plurality of randomly structured test forms for testing an automatic document processing system, the method comprising:

selecting a predetermined type of form;
determining randomly sizes of major portions of the form;
defining randomly for each of the major portions data fields, locations of the data fields within each major portion, and the types of data within each field;
generating a layout data file for a template of said form that provides information on the defined data fields, locations of data fields and types of data within each of the fields of said major portions;
populating in accordance with said layout data file each of said data fields of said template with randomly selected data to produce a version of a test form; and repeating said determining, said defining, said generating, and said populating a plurality of times to produce a plurality of different versions of said test form.

12. The computer readable storage medium of claim 11, wherein said defining comprises selecting the data fields for each major portion and the locations of the data fields within each said major portion based upon a size selected for said major portion.

13. The computer readable storage medium of claim 12, wherein said defining further comprises defining the orientations of the major portions on the template of the form.

14. The computer readable storage medium of claim 13, wherein said major portions comprise a header, a footer and a body, and wherein said defining comprises defining said body portion by randomly defining a plurality of columns for predetermined different types of data, and providing a column heading for each column that identifies the type of data in said each column.

15. The computer readable storage medium of claim 11, wherein generating said layout data file comprises generating an electronic file that defines data field locations within said major portions relative to a reference location on said template.

16. The computer readable storage medium of claim 11, wherein said generating a layout data file comprises creating a file defining where data are located within data fields, and defining the formats of the data.

17. A computer system comprising a computer embodying instructions for controlling the operation of the computer to generate a plurality of randomly structured test forms for testing an automatic document processing system, the computer system operating to:
　selecting a predetermined type of form;
　determining randomly sizes of major portions of the form;
　defining randomly for each of the major portions data fields, locations of the data fields within each major portion, and the types of data within each field;
　generating a layout data file for a template of said form that provides information on the defined data fields, locations of data fields and types of data within each of the fields of said major portions;
　populating in accordance with said layout data file each of said data fields of said template with randomly selected data to produce a version of a test form; and
　repeating said determining, said defining, said generating, and said populating a plurality of times to produce a plurality of different versions of said test form.

18. The computer system of claim 17, wherein said computer system comprises an output device for outputting said test form.

* * * * *